(Model.)

M. J. AHLGRIM.
CALF WEANER.

No. 353,411. Patented Nov. 30, 1886.

WITNESSES:

INVENTOR:
M. J. Ahlgrim
BY Munn & Co.
ATTORNEYS.

UNITED STATES PATENT OFFICE.

MAX J. AHLGRIM, OF ROSE LAWN, INDIANA.

CALF-WEANER.

SPECIFICATION forming part of Letters Patent No. 353,411, dated November 30, 1886.

Application filed March 9, 1886. Serial No. 194,570. (Model.)

*To all whom it may concern:*

Be it known that I, MAX J. AHLGRIM, of Rose Lawn, in the county of Newton and State of Indiana, have invented a new and useful Improvement in Calf-Weaners, of which the following is a specification, reference being had to the annexed drawings, forming a part thereof, in which—

Figure 1:
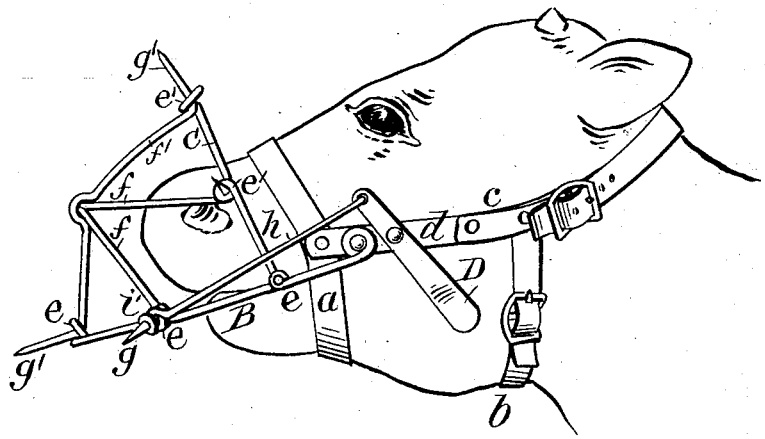
Figure 2:
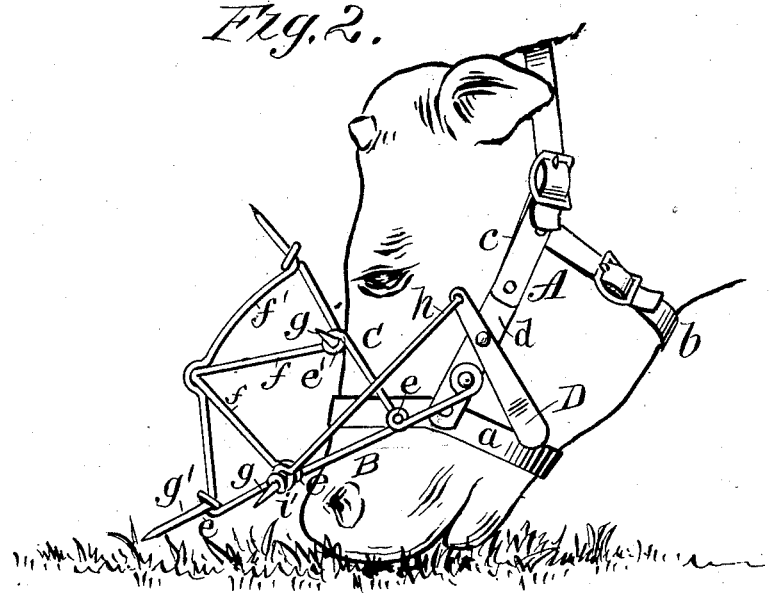
Figure 3:
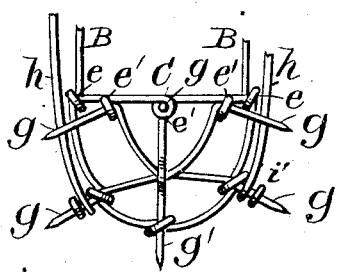

Figure 1 is a side elevation showing the position of the device when the head of the animal is elevated. Fig. 2 is a side elevation showing the position of the device when the animal is grazing. Fig. 3 is a detail view of a portion of the muzzle.

Similar letters of reference indicate corresponding parts in the different figures of the drawings.

The object of my invention is to provide a simple and effective device which will prevent the calf from sucking, but will permit it to graze.

My invention consists in a half-muzzle formed of wire, pivoted to a halter, and connected by rods with weighted levers pivoted to the sides of the halter, and arranged to lift the muzzle when the animal is in position for grazing, as hereinafter more fully described.

The halter A, which supports the barbed half-muzzle, is provided with a nose-strap, $a$, throat-strap $b$, and cheek-straps $c$, each cheek-strap $c$ having a metallic section, $d$, which is connected with the nose-strap $a$. To the metallic sections $d$ is pivoted a wire loop, B, which surrounds the nose of the animal, and is provided at equal intervals with eyes $e$, formed by bending the wire spirally.

In the eyes $e$, upon opposite sides of the loop B, are inserted and soldered the right-angled ends of the wire loop C, and in the wire loop C are formed eyes $e'$, at equal intervals, by bending the wire spirally. Curved wires $f$, having their ends bent outwardly and pointed, are crossed at the center of the half-muzzle, and the pointed ends $g$ are inserted in the eyes $e$ $e'$ of the loops B C. A curved wire, $f'$, having pointed ends $g'$, is arranged along the median line of the half-muzzle, with its pointed ends $g$ inserted in the center eye $e'$ of the loop C, and in the center eye $e$ of the loop B, the wire $f'$ being bent to embrace the wires $f$ $f$ at their point of intersection. The wires $ff$ and $f'$ are soldered together where they cross each other, and their ends are soldered in the eyes in which they are received.

To the metallic part $d$ of each cheek-strap $c$ is pivoted a weighted lever, D, the shorter arm of which is connected by a wire, $h$, with the lateral points $g$, projecting from the loop B, the ends of the connecting-rods $h$ being retained on the points $g$ by collars $i'$. When the levers D are brought into an approximately horizontal position by the animal while grazing, the weighted end thereof raises the half-muzzle from before the mouth of the animal and permits it to graze; but when the animal's head is raised, the weighted levers D being more nearly in a vertical position, their weight being insufficient to raise and support the muzzle, the muzzle drops before the nose and mouth of the animal and presents the points, which will prick the cow, and thus prevent the calf from sucking.

Having thus described my invention, what I claim as new, and desire to secure by Letters Patent, is—

1. A calf-weaner formed of a halter provided with metallic side pieces, $d$, the wire loop B, pivoted thereto, and provided with eyes $e$, the wire loop C, connected with the sides of the loop B, and provided with eyes $e'$, the curved pointed wires $f$ $f$ $f'$, crossing each other and received in the eyes $e$ $e'$, the weighted levers D, pivoted to the sides of the halter, and the connecting-rods $h$, connecting the shorter arms of the levers with the lateral points $g$, projecting from the loop B, substantially as herein shown and described.

2. As an improved article of manufacture, a calf-weaner consisting of a half-muzzle formed of wire loops B C, with projecting points $g$ $g'$, passing through eyes $e$ $e'$, formed on the loops B and C, the joints being secured by galvanizing or tinning, a halter, A, provided with metallic side pieces, $d$, and supporting the pivots of the muzzle, and weighted levers D, pivoted to the metallic plates of the halter, and connected by rods $h$ with the lateral points $g$, as herein shown and described.

MAX J. AHLGRIM.

Witnesses:
J. W. TANNER,
C. A. HAMILTON.